Feb. 3, 1959
E. COLMAN
2,871,984
CHECK STAND
Filed Feb. 24, 1956
3 Sheets-Sheet 1
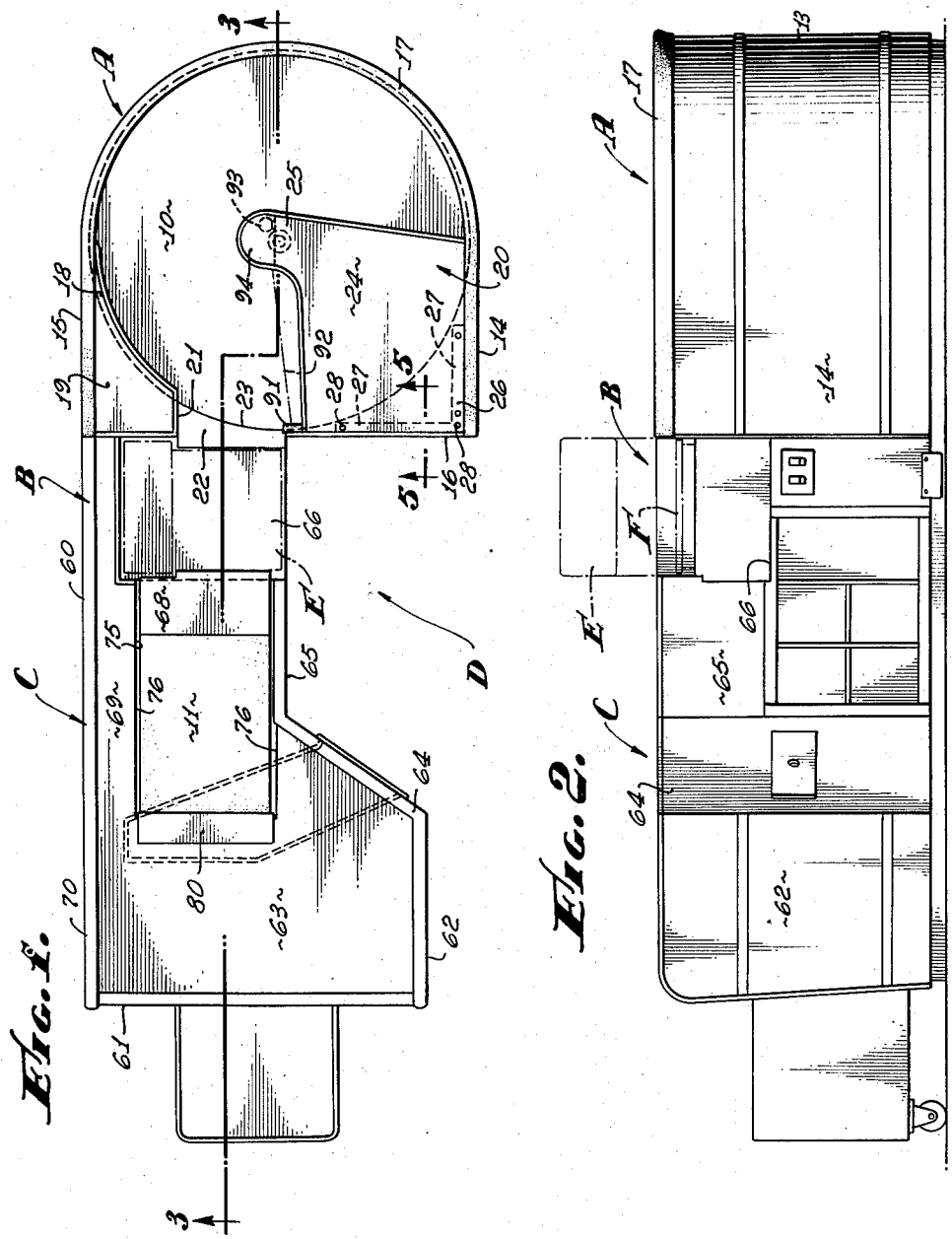
EDWARD COLMAN
INVENTOR.
BY
Bernard Kriegel
ATTORNEY.

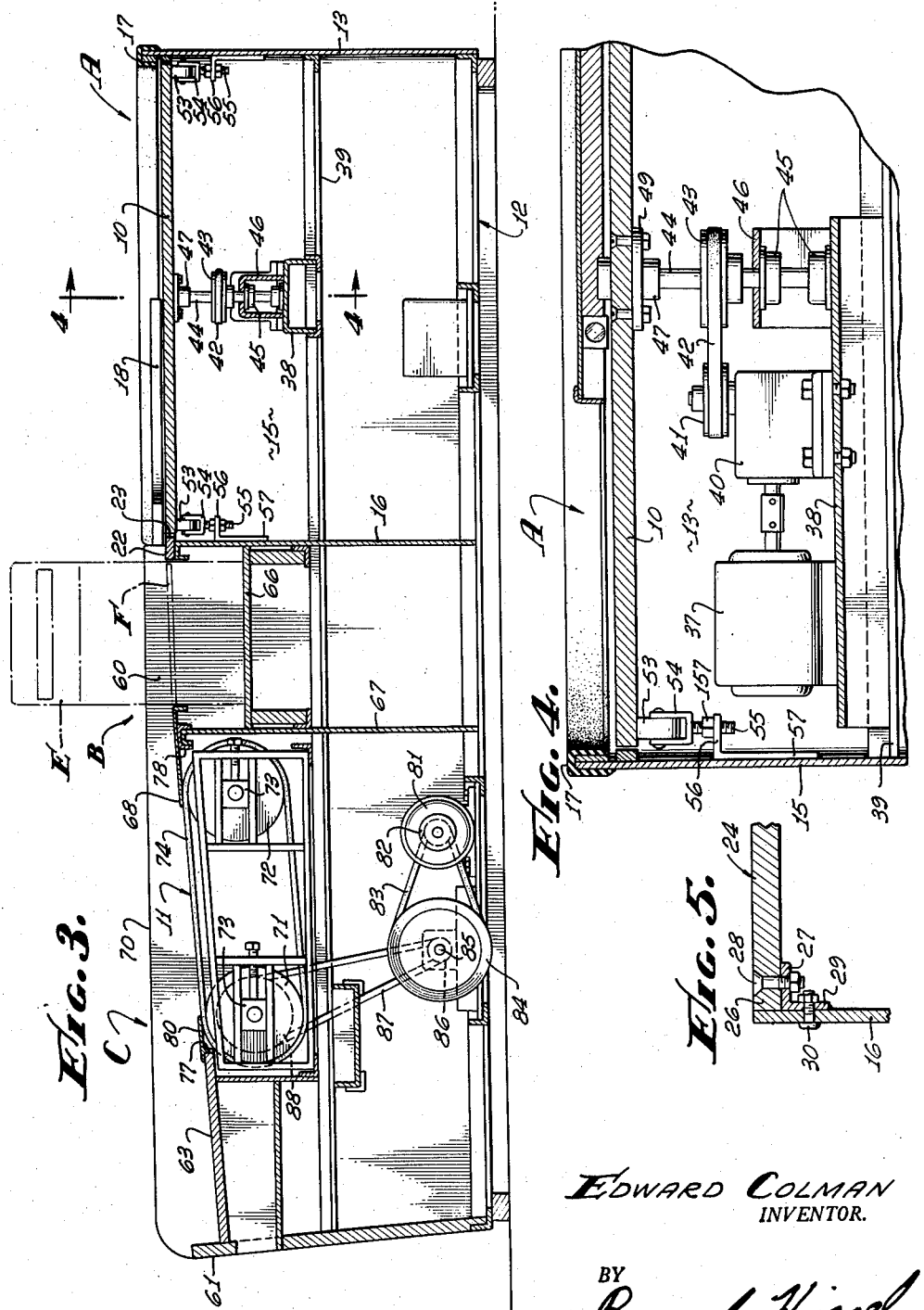

Feb. 3, 1959 E. COLMAN 2,871,984
CHECK STAND
Filed Feb. 24, 1956 3 Sheets-Sheet 3
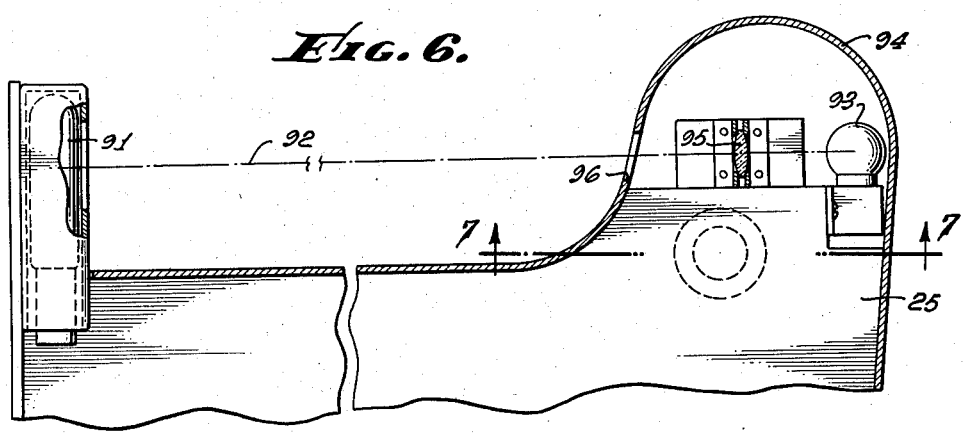
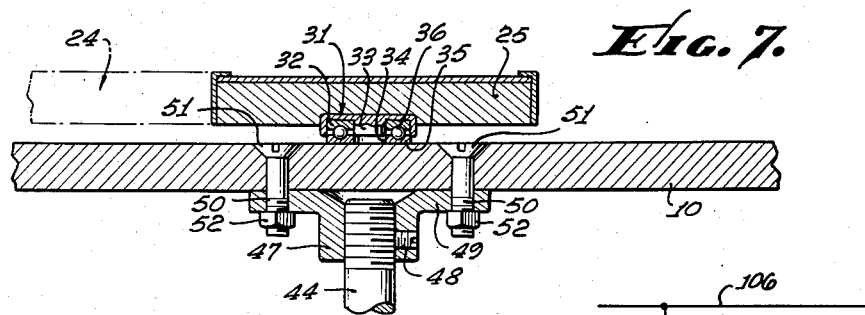
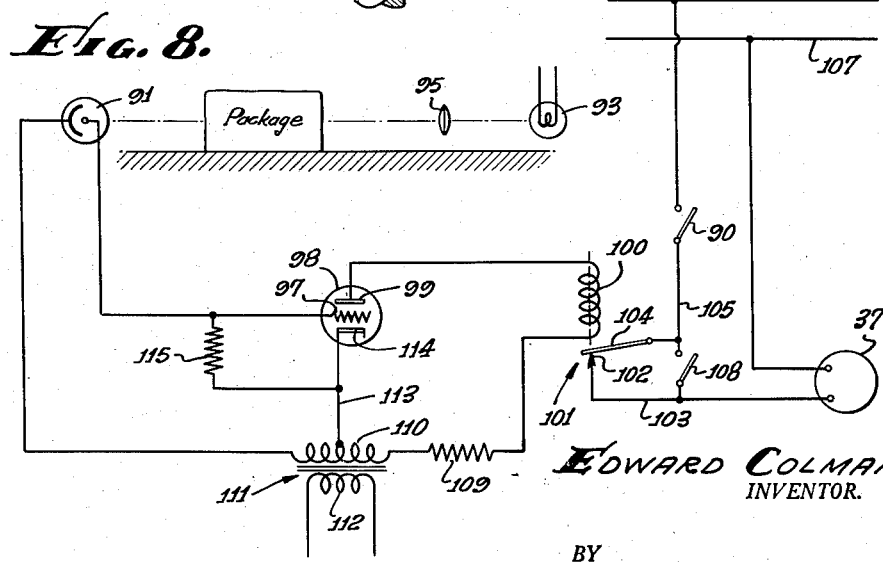
EDWARD COLMAN
INVENTOR.
BY
Bernard Kriegel
ATTORNEY.

United States Patent Office 2,871,984
Patented Feb. 3, 1959

2,871,984

CHECK STAND

Edward Colman, Los Angeles, Calif., assignor to Du-More Fixture Co., Inc., Los Angeles, Calif., a corporation of California Application February 24, 1956, Serial No. 567,546

7 Claims. (Cl. 186—1)

The present invention relates to check stands or check-out counters for self-service retail stores, such as supermarkets, and more particularly to check stands of the conveyor type for bringing the various articles purchased by the customer to the store cashier for the purpose of enabling their values to be registered on a cash register and the required amount collected from the customer.

An object of the present invention is to provide an improved check stand that expedites the actions of the store clerk, such as a checker or cashier, in handling, registering and collecting for the various articles purchased by the customer. The physical work required of the clerk in performing the above functions is reduced considerably.

Another object of the invention is to provide a check stand, or check-out counter, embodying an improved receiving conveyor on which the customer places the purchased items for transmission to the location of the checker or cashier.

An additional object of the invention is to provide a check stand or check-out counter embodying an automatically operated receiving conveyor on which the customer places the purchased items for conveyance to the cashier, the conveyor stopping automatically when an item or items are immediately adjacent the cashier, and restarting automatically in the absence of an item in such conveniently adjacent position.

A further object of the invention is to provide a check stand embodying a receiving conveyor of the turntable type over which a cash register support is mounted, and having an improved drive and support for the turntable, to assure its better operation, and in which an improved arrangement is utilized for carrying at least part of the cash register support on the turntable.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a top plan view of a check stand or check-out counter apparatus embodying the invention;

Fig. 2 is a side elevational view of the apparatus;

Fig. 3 is an enlarged vertical section taken generally along the line 3—3 on Fig. 1;

Fig. 4 is an enlarged cross-section taken along the line 4—4 on Fig. 3;

Fig. 5 is an enlarged cross-section taken along the line 5—5 on Fig. 1;

Fig. 6 is a top plan view of a portion of the automatic control mechanism for determining the operation of the conveyor portion of the apparatus;

Fig. 7 is a cross-section taken along the line 7—7 on Fig. 6;

Fig. 8 is a circuit diagram of the automatic and manual controls for the receiving conveyor portion of the apparatus.

The check stand or check-out counter disclosed in the drawings includes a receiving counter or station A, on which a customer will place articles that are purchased, a weighing station B, on which any purchased item to be weighed may be placed by the cashier, and a delivery station C, where the articles that have already been checked out by the cashier can be placed. As specifically disclosed, the receiving station is a conveyor 10 that will transport the items placed thereon to a location convenient to the cashier, whereas the delivery counter or station may also include a discharge or delivery conveyor 11 for carrying the articles that have already been checked out by the cashier or clerk away from the location of such person to the end portion of the delivery counter, where the items may be appropriately placed in cartons or bags.

The receiving counter or station A includes a suitable supporting frame 12, the end portion 13 of which is curved or generally semi-circular in shape, such end portion merging into opposed side or vertical walls 14, 15 which terminate at a forward end wall portion 16 of the receiving counter. The receiving conveyor 10 is constituted as a turntable rotatable about a vertical axis, the periphery of the turntable conforming to the semi-circular end wall 13 and being disposed in a horizontal position at a convenient height above the floor of the building in which the check-out counter is located. The curved end wall 13 has an upper guard rail 17 thereon which also extends along the upper edges of the vertical walls 14, 15, the curved guard rail preferably overhanging the marginal portion of the turntable 10 to a small extent, to prevent articles from overhanging the turntable periphery, and possibly becoming wedged between it and the vertical walls 13, 14, 15 of the receiving counter structure.

The turntable 10 is also marginally covered by a curved rail portion 18, conforming to the curvature of the turntable periphery, of a fixed top member 19 secured to one of the side walls 15 and extending inwardly to a small extent toward the opposite side wall 14. The curved rail 18 secured to the top panel member 19 constitutes a general continuation of the semi-circular side or safety rail 17 that extends a slight distance above the top of the turntable 10.

Extending from the side wall 14 of the receiving counter is a cash register support 20 which projects over a sector of the turntable 10 toward the opposite side wall 15. Preferably, the cash register support 20 does not extend more than half way across the turntable from the side wall 14, being spaced from the inner edge 21 of the fixed top panel 19 by a substantial distance, to permit articles on the turntable 10 to slide onto a flat bridge piece 22, the upper surface of which lies in substantially the same plane as the upper surface of the turntable 10, and which has an edge 23 conforming to the periphery of the turntable. This bridge piece 22 only extends a short distance to the weighing station B of the apparatus.

The cash register support 20 includes a panel 24 carried by the side wall 14 and part of the forward wall 16 of the receiving counter A. The panel 24 extends over a sector of the turntable 10, with the inner portion 25 of the panel extending beyond the axis of rotation of the turntable. A forward margin 26 of the panel rests upon the flange 27 of an angle iron to which it is secured, as by means of countersunk bolts 28, or the like, the vertical flange 29 of this angle iron being suitably secured to the forward wall 16, as by means of the bolts or screws 30 disclosed. The side marginal portion of the panel is secured to the side wall 14 in a similar manner, resting upon a horizontal flange 27 of an angle iron to which it is suitably secured, the vertical flange of this angle iron being attached to the upper portion of the side wall 14. The angle iron secured to the forward wall 16 extends from the other angle iron attached to the side wall 14 and terminates a substantial distance from the weighing station B, to avoid interference with the turntable.

The cash register supporting panel 24 is carried by the side and front walls 14, 16 of the counter described, and is also carried by the turntable 10 itself. Thus, the inward extension 25 of the register panel rests upon a ball bearing structure 31, which also bears upon the upper surface of the turntable 10 (Fig. 7). The ball bearing structure specifically disclosed includes an upper race 32 suitably secured to the bottom of the panel extension 25 and having a central stud portion 33 received within a companion bore 34 in a lower race 35 resting upon the turntable 10. Ball bearing elements 36 are disposed in the opposed races 32, 35, the common axis of both the upper and lower races coinciding with the axis of the turntable 10, in order that rotation of the turntable 10 can take place without tending to turn the register support panel 24 itself.

By virtue of the register support structure disclosed, a strong and sturdy arrangement has been provided for supporting a cash register in a convenient location and at a convenient height for easy use by the cashier. The cash register is normally placed on the supporting panel 24 to face in a forward direction, the cashier standing in front of the cash register and in the recess or space D provided in the check-out counter between the receiving counter A and the rear portion of the delivery counter C.

The turntable 10 is rotated by a suitable motor 37 mounted on a base 38 carried by an intermediate horizontal supporting structure 39 of the receiving counter, which may extend between and be secured to its vertical walls 13, 14, 15. The rotation and torque of the motor is transferred to a gear or speed reducer 40 having a driving pulley 41 attached thereto which will, of course, be rotated at a considerably lesser speed than the motor 37, because of the speed reduction accomplished in the gear reducer. A belt 42 encompasses the pulley and passes around a driven pulley 43 secured to a vertical turntable support shaft 44, the lower portion of which passes through and is rotatable within suitable anti-friction vertically spaced bearing supports 45 carried by a bracket 46 attached to the base 38. The bearings 45 are preferably of the type capable of withstanding axial loads, as well as radial loads.

The upper end of the vertical supporting shaft 44 (Fig. 7) has a coupling 47 threadedly mounted thereon and secured firmly thereto by means of a set screw 48 passing through the coupling hub and engaging the shaft 44. This coupling has a flange 49 engaging the underside of the turntable 10, the flange being firmly attached to the latter by bolts 50 passing through the turntable 10 and the flange 49. The bolts have countersunk heads 51 flush with the upper surface of the turntable, nuts 52 being threaded on the bolts 50 and engaging the coupling flange 49 to firmly attach the turntable to the shaft, the shaft, of course, being located to rotate about the axis of rotation of the turntable 10, which is also the axis about which the races 32, 35 and ball bearings 36 will revolve.

While the vertical shaft 44 supports the turntable 10, deflection of the latter can be minimized, and its smoothness of operation further insured, by providing circumferentially spaced supporting rollers 53 engaging the underside of the turntable 10 adjacent its periphery, the rollers being suitably mounted for rotation about horizontal, radial axes in suitable U-shaped brackets 54 having depending threaded shafts 55 extending through companion threaded holes in horizontal supporting flanges 56 which are integral with vertical flanges 57 suitably attached to the vertical walls 13—16. The brackets 54 can be adjustably threaded in the support 56 to insure proper rolling engagement of the rollers with the undersurface of the turntable, after which a lock nut 157 threaded on each bracket shaft is tightened against the support 56 to hold the bracket roller 53 in appropriate position.

The cashier stands in front of the register on the panel 24, the turntable being rotatable in a counter-clockwise direction, as disclosed in Fig. 1. The customer places the purchased items on the turn table 10 at the curved end wall 13, the turntable then carrying the articles in a clockwise direction to a location adjacent the cash register panel 24 to the left of the cashier. The cashier will record the purchase price of each item on the cash register and will then manually slide the recorded item along the bridge piece 22 and to the weighing station B, or along the weighing station to the delivery counter C, where the item will be conveyed to the forward portion for appropriate packaging.

The delivery counter C includes a vertical or side wall 60 which may be a continuation of the side wall 15 of the receiving counter, as well as a forward end wall 61. It also includes a vertical side wall 62 at the other end of the end wall 61 which is spaced a substantial distance from the first-mentioned vertical wall 60 to provide a relatively wide counter top 63 on which articles that have been already registered on the cash register can be placed. From the side wall 62, there is a diagonal vertical wall 64 inclined in a direction toward the other side wall 60 and the receiving counter A, this side wall then being connected with another vertical side wall 65 which is much closer to the opposed side wall 60 of the counter than the vertical side wall 62 at the end portion of the delivery counter. The side wall 65 terminates a substantial distance forwardly from the top bridge piece 22, providing a space for a weighing scale E that is carried on a suitable supporting structure 66 that may be carried by both the end wall 16 of the receiving counter and an end wall 67 of the delivery counter extending between its side walls 60, 65.

The support 66 for the weighing scale E is arranged at such a height that the platform F of the scale will form a continuation of the bridge piece 22. Preferably, the platform F of the scale inclines slightly in a downward and forward direction toward the delivery counter C, merging into an inclined top plate 68 of the delivery counter, which may be considered as constituting part of an inclined delivery counter top portion 69, which slopes in a downward direction from the scale E to the end wall 61 of the delivery counter. The inclined top 69 of the delivery counter is disposed below the upper edges 70 of the side and end walls 60, 61, 62, 64, 65, the upper portions of which function as confining members for the items on the discharge counter. The weighing scale platform F and the discharge counter top 69 are inclined to facilitate the forward movement of articles that have already been recorded on the cash register by taking advantage of the force of gravity.

To expedite movement of the items that have been recorded on the cash register away from the cashier, who stands in the space D defined between the forward end wall 16 of the receiving counter, the inclined wall 64 of the delivery counter, and the side wall 65 at the scale E, a discharge conveyor 11 is incorporated in the delivery counter C. This discharge conveyor includes a pair of longitudinally spaced conveyor pulleys 71, 72 mounted for rotation about horizontal axes in suitable supporting brackets 73 carried by the discharge counter, there being a conveyor belt 74 passing around the pulleys 71, 72 and also along an opening 75 in the top portion 69 of the delivery counter, the opening being defined by spaced side edges 76 in the delivery counter, which may be substantially parallel to the side walls 60, 62, 65 of the delivery counter, by a forward edge 77 of the counter spaced a substantial distance from its end wall 61, and by a rear edge portion 78 adjacent the scale E, which is bridged partially by the inclined top plate 68. The conveyor belt 74 passes around the pulleys 71, 72, its upper run moving along the opening 75 in a plane which is substantially a continuation of the inclined top plate 68, which terminates immediately above the rearward portion of the conveyor belt. The articles will be carried by the conveyor belt 74 to the other end of the counter opening, there being a suitable bridge plate 80 secured to the inclined top 69 and projecting a sufficient distance over the belt so that the articles conveyed on the belt will be moved thereby onto the bridge plate 80, where they will slide along the inclined top 63 toward the end wall 61.

The conveyor pulleys 71, 72 and belts 74 are rotatable by a suitable electric motor 81 carried by the discharge counter C, this motor having a driving pulley 82 over which a belt 83 passes, which, in turn, passes over a much larger driven pulley 84 secured to a shaft 85 carrying another pulley 86 over which another belt 87 passes that extends to another pulley 88 secured to rotate with one of the conveyor pulleys 71. It is evident that the belt and pulley arrangement provided effects a substantial reduction in speed between the motor 81 and the conveyor pulleys 71, 72, so that the conveyor belt 74 will move at the desired linear rate.

The cashier will record the value of the items on the cash register and then slide the items from the turntable 10, over the plate 22, inclined scale platform F and the inclined top plate 68, to the conveyor belt 74, where the conveyor will carry the articles away from the cashier toward the forward end 63 of the delivery counter. Of course, articles that require weighing will merely be moved by the cashier onto the scale E, and their weight and purchase price noted, after which the cashier will continue movement of such items onto the delivery or discharge conveyor belt 74.

Normally, the discharge conveyor 11 will operate continuously, although it can be stopped by the cashier at any time through manipulation of a suitable switch (not shown) to open the circuit to the electric motor. However, it is desired that the receiving conveyor 10 rotate only so long as there are no articles or items on the turntable adjacent the cashier, which are to be recorded. The cashier can operate a suitable switch 90 to control the rotation of the turntable or receiving conveyor, but it is preferred that such control also be effected automatically. In other words, if no articles are disposed on the turntable 10 immediately to the left of the cash register panel 24, the turntable will be rotating, but as soon as articles arrive at such location, the turntable will be stopped automatically.

The starting and stopping of the turntable is effected by controlling the circuit to the turntable motor 37. This is accomplished automatically by virtue of the presence or absence of an article or item on the turntable immediately to the left of the cash register panel. As specifically disclosed, a photoelectric control circuit is employed (Fig. 8). Thus, a phototube 91 is disposed adjacent the forward wall 16 of the receiving counter A and the left edge of the cash register supporting panel, this phototube being adapted to receive a beam of light 92 emanating from a suitable light source 93 disposed in a housing 94 that extends outwardly from the register support panel 24. Light from the source passes through a suitable focusing lens 95 and through an opening 96 in the housing to the phototube 91. As long as the light beam is being transmitted to the phototube 91, the circuit to the electric motor 37 is completed and the turntable 10 will rotate. However, when the light beam 92 is interrupted, as by the presence of an article or item on the turntable between the light source and the phototube, the circuit to the motor will be interrupted and rotating of the turntable will cease.

A photoelectric control circuit is disclosed diagrammatically in Fig. 8. As shown therein, a beam of light 92 from the light source 93 will normally be directed upon the phototube 91, which will determine the voltage applied to the control grid 97 of a thyratron tube 98. The plate 99 of the thyratron tube is connected to the coil 100 of a normally closed motor stopping relay 101. This relay includes a contact 102 connected through a suitable lead 103 to the motor 37, and has an armature arm 104 connected through another lead 105 to one line 106 of the source of electric power. The other side 107 of the power source is connected directly to the motor 37.

In lieu of connecting the armature arm 104 directly to one side 106 of the power source, the manually operated switch 90 is disposed in the line, to enable the cashier to discontinue the operation of the turntable 10 at will. Similarly, another manually operated switch 108 may be disposed between the line 105 leading to the relay armature 104 and the line 103 leading to the motor, to enable the motor to be started and operated regardless of the fact that the relay switch 101 may be open. Normally, the manual switch 90 will be closed and the other manual switch 108 which by-passes the relay will be open.

When the thyratron tube 98 fires, the circuit through the relay coil 100 is completed, which disengages the armature arm 104 from the contact 102, thereby opening the circuit to the electric motor 37. The other side of the relay coil 100 is connected through a suitable resistance 109 to one end of the secondary winding 110 of a transformer 111, the other end of which is connected to the phototube 91. Current is supplied to the secondary winding 109 of the transformer from the primary coil 112 in the usual manner. A lead 113, tapped from the secondary of the transformer, runs to the thyratron cathode 114, which has a separate heater (not shown) for energizing it. A resistance 115 is also connected across the control grid 97 and the cathode 114, to provide a sufficiently low negative bias voltage on the grid when light is not being imposed on the phototube 91, which enables the thyratron tube 98 to fire, and thereby energize the relay coil 100. So long as light is passing to the phototube 91, however, the negative voltage imposed on the control grid 97 is below the critical value, to prevent the tube from firing, thereby insuring that the relay 101 will be closed, under which condition the motor 37 and turntable 10 are rotated.

In the operation of the electric control circuit, in the absence of any articles on the turntable adjacent the cash register panel, the beam of light 92 from the light source 93 is striking the phototube 91, producing a current of a value to insure sufficient negative bias on the grid 97 to prevent firing of the thyratron tube 98, in which event the motor and turntable are rotated. When an item placed on the turntable by a customer reaches the light beam 92 and interrupts it, the phototube current is dropped to a low value, which decreases the negative grid bias voltage and permits the thyratron plate current to flow, this current passing through the relay coil 100 and causing it to open the associated switch contacts 102, 104, thereby opening the circuit to the motor 37 and resulting in stopping of the turntable 10. When the cashier removes all items or articles from the turntable 10 which have been interrupting the light beam 92, and places them on the scale E or the delivery counter C, the light beam will again reach the photocell 91, interrupting the firing of the thyratron tube and causing the relay 101 to close, which will again start the motor 37 and cause turntable rotation, to move other articles around the turntable to a position adjacent the cash register panel 24, where they can be appropriately registered and handled by the cashier.

In the event the cashier does not wish the turntable to operate automatically, the manual switch 108 can be closed, which will place a shunt around the relay switch 101 and produce a continuous flow of current to the motor 37. If the cashier wishes to stop the motor 37 and the turntable 10 at any time the other manual switch 90 need merely be opened.

It is, accordingly, apparent that a check stand or check-out counter has been provided in which the items being purchased are brought to a convenient position of handling by the cashier, who can register the purchase price of the items on the cash register, and then, with very little effort, slide the items onto the scale E and the discharge counter C, from where they are taken to the position 63 where the items can be collected and placed in cartons, bags, or the like. The operation of the receiving conveyor or turntable 10 is automatic, or it can be manually controlled by the operator. It is unnecessary for the cashier to physically move the articles to the position where they can be checked out on the register. The motion is done by means of the receiving conveyor itself. Similarly, the cashier need only move the articles a short distance to remove them from the vicinity of the receiving conveyor, inasmuch as the delivery conveyor 11 automatically carries the items to a relatively remote point.

The cash register is supported in a strong and sturdy manner on the register support panel 24 by the receiving counter frame, as well as by the turntable itself, which has a very substantial and positive drive for insuring its rotation and the proper conveying of the items from a position well in advance of the cashier to a position adjacent the cashier.

The inventor claims:

1. In a check stand: a substantially horizontally disposed rotatable turntable counter adapted to receive articles; means for rotating said turntable counter about a generally vertical axis; a support for a cash register disposed over a portion of said turntable counter and extending across said vertical axis; and means for supporting said cash register support at said vertical axis, including a bearing resting upon said turntable counter, said cash register support resting upon said bearing, said bearing having an axis coincident with said vertical axis.

2. In a check stand: a substantially horizontally disposed rotatable turntable counter adapted to receive articles; means for rotating said turntable counter about a generally vertical axis; a support for a cash register disposed over a portion of said turntable counter and extending across said vertical axis; and means for supporting said cash register support at said vertical axis, including a lower bearing race resting upon said turntable counter, an upper bearing race engaging said cash register support, rollable bearing elements between and engaging said races, said races having an axis coincident with said vertical axis.

3. In a check stand: a substantially horizontally disposed rotatable turntable counter adapted to receive articles; a vertical shaft secured to said turntable counter to rotate therewith; means including vertically spaced bearings rotatably supporting said shaft in a vertical position; means operatively connected to said shaft for rotating said shaft and turntable counter; a support for a cash register disposed over a portion of said turntable counter and extending across said turntable counter at said vertical shaft; and means for supporting said cash register support on said turntable counter above said vertical shaft, including a bearing between and engaging said turntable counter and cash register support, said bearing having an axis coincident with the axis of said vertical shaft.

4. In a check stand: a substantially horizontally disposed rotatable turntable counter adapted to receive articles; means for rotating said turntable counter; a support for a cash register disposed over a portion of said turntable counter in order that articles on said turntable counter will be conveyed thereby to a location adjacent a side of the cash register support; means for rotating said turntable counter including an electric motor, an electric circuit for said motor; and means for opening and closing said circuit including a light source and a photocell spaced from said source and adapted to receive a light beam therefrom directed generally radially across said turntable counter at said location, said light beam striking said photocell to close said circuit and being interrupted by an article at said location to open said circuit.

5. In a check stand: a substantially horizontally disposed rotatable turntable counter adapted to receive articles; means for rotating said turntable counter; a support for a cash register disposed over a portion of said turntable counter in order that articles on said turntable counter will be conveyed thereby to a location adjacent a side of the cash register support; means for supporting said cash register support adjacent the axis of rotation of said turntable counter; means for rotating said turntable counter including an electric motor, an electric circuit for said motor; and means for opening and closing said circuit including a member providing a source of light and a photocell member, one of said members being carried by said cash register support adjacent said axis of rotation and the other of said members being disposed at the perimeter of said turntable counter adjacent the side of the cash register support, in order that said photocell member is adapted to receive a light beam from said source of light directed generally radially across said turntable counter at said location, said light beam striking said photocell member to close said circuit and being interrupted by an article at said location to open said circuit before the article can engage the side of the cash register support.

6. In a check stand: a substantially horizontally disposed rotatable turntable counter adapted to receive articles; a vertical shaft secured to said turntable counter to rotate therewith; means rotatably supporting said shaft in a vertical position; means operatively connected to said shaft for rotating said shaft and turntable counter; a support for a cash register disposed over a portion of said turntable counter and extending across said turntable counter at said vertical shaft; and means for supporting said cash register support on said turntable counter above said vertical shaft, including a bearing between and engaging said turntable counter and cash register support, said bearing having an axis coincident with the axis of said vertical shaft.

7. In a check stand adapted to be operated by a cashier: a substantially horizontally disposed rotatable turntable counter adapted to receive articles; means for rotating said turntable counter to convey articles placed thereon to a predetermined location adjacent the normal position of the cashier; means for rotating said turntable counter including an electric motor, an electric circuit for said motor; and means for opening and closing said circuit including a light source and a photocell spaced from said source and adapted to receive a light beam therefrom directed generally radially across said turntable counter at said predetermined location, said light beam striking said photocell to close said circuit and being interrupted by an article at said location to open said circuit.

References Cited in the file of this patent

UNITED STATES PATENTS

| | | |
|---|---|---|
| 1,140,176 | Martzolf | May 18, 1915 |
| 1,809,951 | Vilfordi | June 16, 1931 |
| 2,599,909 | George | June 10, 1952 |
| 2,631,689 | Rubaloff | Mar. 17, 1953 |
| 2,669,323 | Hilliker | Feb. 16, 1954 |
| 2,723,728 | Crawford | Nov. 15, 1955 |